United States Patent
Ji et al.

(10) Patent No.: US 9,850,986 B2
(45) Date of Patent: Dec. 26, 2017

(54) PLANETARY GEAR TRAIN OF AUTOMATIC TRANSMISSION FOR VEHICLE

(71) Applicant: Hyundai Motor Company, Seoul (KR)

(72) Inventors: Seongwook Ji, Ansan-si (KR); Seong Wook Hwang, Gunpo-si (KR); Hyun Sik Kwon, Seoul (KR); Wonmin Cho, Hwaseong-si (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/221,836

(22) Filed: Jul. 28, 2016

(65) Prior Publication Data
US 2017/0159767 A1   Jun. 8, 2017

(30) Foreign Application Priority Data

Dec. 2, 2015  (KR) .................. 10-2015-0171007

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0065* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 8,556,768 B2 * | 10/2013 | Park | F16H 3/663 475/278 |
| 8,597,152 B2 | 12/2013 | Seo et al. | |
| 9,328,804 B1 * | 5/2016 | Ji | F16H 3/66 |

FOREIGN PATENT DOCUMENTS

JP  2015-059619 A  3/2015

* cited by examiner

*Primary Examiner* — Dirk Wright
(74) *Attorney, Agent, or Firm* — Morgan, Lewis & Bockius LLP

(57) ABSTRACT

Nine or more forward speeds and at least one reverse speed are achieved by a planetary gear train of an automatic transmission for a vehicle including an input shaft, an output shaft, three planetary gear sets respectively having four rotation elements, and six control elements for selectively interconnecting the rotation elements.

10 Claims, 2 Drawing Sheets

FIG. 2

| shift-stage | C1 | C2 | C3 | B1 | B2 | B3 | gear ratio |
|---|---|---|---|---|---|---|---|
| D1 |  |  |  | ● |  | ● | 5.440 |
| D2 |  | ● |  |  |  | ● | 3.400 |
| D3 |  | ● |  | ● |  |  | 2.500 |
| D4 |  | ● |  |  | ● |  | 1.735 |
| D5 | ● | ● |  |  |  |  | 1.261 |
| D6 |  | ● | ● |  |  |  | 1.000 |
| D7 | ● |  | ● |  |  |  | 0.823 |
| D8 |  |  | ● |  | ● |  | 0.694 |
| D9 |  |  | ● | ● |  |  | 0.615 |
| REV | ● |  |  |  |  | ● | 4.431 |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0171007 filed on Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering hard competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight, and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least nine forward speeds and at least one reverse speed, thereby improving power delivery performance and fuel consumption due to multi-stages, and improving driving stability of a vehicle by utilizing a low rotation speed of an engine.

A planetary gear train according to an exemplary embodiment may include an input shaft for receiving an engine torque, an output shaft for outputting a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, and six control elements for selectively interconnecting the rotational elements and a transmission housing.

The planetary gear train according to an exemplary embodiment may further include a first connecting member connected with the first rotational element and directly connected with the transmission housing, a second connecting member connected with the second rotational element and the fifth rotational element, and selectively connectable with the transmission housing, a third connecting member connected with the third rotational element, and selectively connectable with the input shaft, a fourth connecting member connected with the fourth rotational element and directly connected with the input shaft, a fifth connecting member connected with the sixth rotational element and the ninth rotational element, and selectively connectable with the transmission housing, a sixth connecting member connected with the seventh rotational element and the tenth rotational element, and selectively connectable with the input shaft, a seventh connecting member connected with the eighth rotational element and the twelfth rotational element, and selectively connectable with the transmission housing, and an eighth connecting member connected with the eleventh rotational element and directly connected with the output shaft.

The first planetary gear set may be a single pinion planetary gear set, where the first rotational element is a first sun gear, the second rotational element is a first planet carrier, and the third rotational element is a first ring gear. The second planetary gear set may be a single pinion planetary gear set, where the fourth rotational element is a second sun gear, the fifth rotational element is a second planet carrier, and the sixth rotational element is a second ring gear. The third planetary gear set may be a single pinion planetary gear set, where the seventh rotational element is a third sun gear, the eighth rotational element is a third planet carrier, and the ninth rotational element is a third ring gear. The fourth planetary gear set may be a single pinion planetary gear set, where the tenth rotational element is a fourth sun gear, the eleventh rotational element is a fourth planet carrier, and the twelfth rotational element is a fourth ring gear.

The six control elements may include a first clutch selectively connecting the input shaft and the third connecting member, a second clutch selectively connecting the input shaft and the sixth connecting member, a third clutch selectively connecting the input shaft and the seventh connecting member, a first brake selectively connecting the second connecting member and the transmission housing, a second brake selectively connecting the fifth connecting member and the transmission housing, and a third brake selectively connecting the seventh connecting member and the transmission housing.

Shift stages realized by selective operation of two control elements of the six control elements may include a first forward speed formed by simultaneous operation of the first and third brakes, a second forward speed formed by simultaneous operation of the second clutch and the third brake, a third forward speed formed by simultaneous operation of the second clutch and the first brake, a fourth forward speed formed by simultaneous operation of the second clutch and the second brake, a fifth forward speed formed by simultaneous operation of the first and second clutches, a sixth forward speed formed by simultaneous operation of the second and third clutches, a seventh forward speed formed by simultaneous operation of the first and third clutches, an eighth forward speed formed by simultaneous operation of the third clutch and the second brake, a ninth forward speed formed by simultaneous operation of the third clutch and the first brake, and a reverse speed formed by simultaneous operation of the first clutch and the third brake.

A planetary gear train according to an exemplary embodiment of the present invention may realize at least nine forward speeds and at least one reverse speed formed by operating the four planetary gear sets as simple planetary gear sets by controlling six control elements.

In addition, a planetary gear train according to an exemplary embodiment of the present invention may substantially improve driving stability by realizing shift stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is operational chart for respective control elements at respective shift stages in a planetary gear train according to an exemplary embodiment of the present invention.

Figure 1:
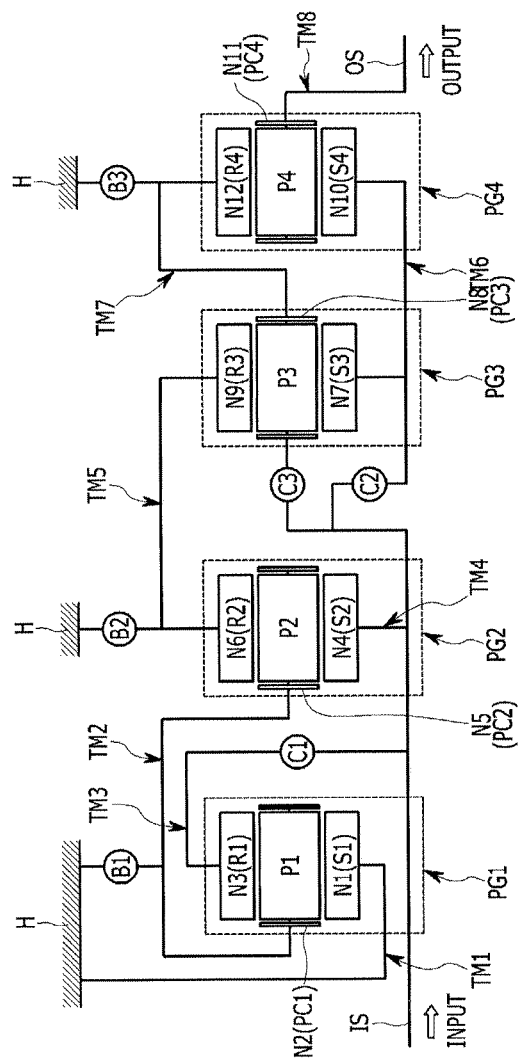
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second, and the like is to divide the names because the names of the components are the same as each other, and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 arranged on a same axis, an input shaft IS, an output shaft OS, eight connecting members TM1 to TM8 for interconnecting rotational elements of the first, second, third, and fourth planetary gear sets PG1, PG2, PG3, and PG4, six control elements C1 to C3 and B1 to B3, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, second, third, and fourth planetary gear sets PG1, PG2, PG3, and PG4, from an engine side.

The input shaft IS is an input member, and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the second rotational element N2 is directly connected with the fifth rotational element N5, the sixth rotational element N6 is directly connected with the ninth rotational element N9, the seventh rotational element N7 is directly connected with the tenth rotational element N10, and the eighth rotational element N8 is directly connected with the twelfth rotational element N12, by eight connecting members TM1 to TM8.

The eight connecting members TM1 to TM8 are arranged as follows.

The first connecting member TM1 is connected with the first rotational element N1 (first sun gear S1), and directly connected with the transmission housing H, thereby continuously acting as a fixed element.

The second connecting member TM2 is connected with the second rotational element N2 (first planet carrier PC1) and the fifth rotational element N5 (second planet carrier PC2), and selectively connectable with the transmission housing H, thereby acting as a selective fixed element.

The third connecting member TM3 is connected with the third rotational element N3 (first ring gear R1), and selectively connectable with the input shaft IS, thereby acting as a selective input element.

The fourth connecting member TM4 is connected with the fourth rotational element N4 (second sun gear S2), and directly connected with the input shaft IS, thereby continuously acting as an input element.

The fifth connecting member TM5 is connected with the sixth rotational element N6 (second ring gear R2) and the ninth rotational element N9 (third ring gear R3), and selectively connectable with the second transmission housing H, thereby acting as a selective fixed element.

The sixth connecting member TM6 is connected with the seventh rotational element N7 (third sun gear S3) and the tenth rotational element (N10; fourth sun gear C4), and selectively connectable with the input shaft IS, thereby acting as a selective input element.

The seventh connecting member TM7 is connected with the eighth rotational element N8 (third planet carrier PC3) and the twelfth rotational element N12 (fourth ring gear R4), and selectively connectable with the transmission housing H, thereby acting as a selective fixed element.

The eighth connecting member TM8 is connected with the eleventh rotational element N11 (fourth planet carrier PC4), and connected with the output shaft OS, thereby continuously acting as an output element.

The connecting members TM1 to TM8 may be selectively interconnected with one another by control elements of three clutches C1, C2, and C3.

The connecting members TM1 to TM8 may be selectively connectable with the transmission housing H, by control elements of three brakes B1, B2, and B3.

The six control elements C1 to C3 and B1 to B3 are arranged as follows.

The first clutch C1 is arranged between the input shaft IS and the third connecting member TM3, such that the input shaft IS and the third connecting member TM3 may selectively become integral.

The second clutch C2 is arranged between the input shaft IS and the sixth connecting member TM6, such that the input shaft IS and the sixth connecting member TM6 may selectively become integral.

The third clutch C3 is arranged between the input shaft IS and the seventh connecting member TM7, such that the input shaft IS and the seventh connecting member TM7 may selectively become integral.

The first brake B1 is arranged between the second connecting member TM2 and the transmission housing H, such that the second connecting member TM2 may selectively act as a fixed element.

The second brake B2 is arranged between the fifth connecting member TM5 and the transmission housing H, such that the fifth connecting member TM5 may selectively act as a fixed element.

The third brake B3 is arranged between the seventh connecting member TM7 and the transmission housing H, such that the seventh connecting member TM7 may selectively act as a fixed element.

The control elements of the first, second, third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to an exemplary embodiment of the present invention.

As shown in FIG. 2, a planetary gear train according to an exemplary embodiment of the present invention performs shifting by operating two control elements at respective shift stages.

In the first forward speed D1, the first and third brakes B1 and B3 are simultaneously operated. As a result, torque of the input shaft IS is input to the fourth connecting member TM4. In addition, while the first connecting member TM1 is acting as a fixed element, the third and seventh connecting members TM3 and TM7 act as fixed elements by the operation of the first and third brakes B1 and B3, thereby realizing the first forward speed by cooperative operation of respective connecting members and outputting a shifted torque through the output shaft OS connected with the eighth connecting member TM8.

In the second forward speed D2, the second clutch C2 and the third brake B3 are simultaneously operated. As a result, the sixth connecting member TM6 is connected with the input shaft IS by the operation of the second clutch C2, and torque of the input shaft IS is input to the fourth connecting member TM4 and the sixth connecting member TM6. In addition, while the first connecting member TM1 is acting as a fixed element, the seventh connecting member TM7 simultaneously acts as a fixed element by the operation of the third brake B3, thereby realizing the second forward speed by cooperative operation of respective connecting members and outputting a shifted torque through the output shaft OS connected with the eighth connecting member TM8.

In the third forward speed D3, the second clutch C2 and the first brake B1 are simultaneously operated. As a result, the sixth connecting member TM6 is connected with the input shaft IS by the operation of the second clutch C2, and torque of the input shaft IS is input to the fourth connecting member TM4 and the sixth connecting member TM6. In addition, while the first connecting member TM1 is acting as a fixed element, the second connecting member TM2 simultaneously acts as a fixed element by the operation of the first brake B1, thereby realizing the third forward speed by cooperative operation of respective connecting members and outputting a shifted torque through the output shaft OS connected with the eighth connecting member TM8.

In the fourth forward speed D4, the second clutch C2 and the second brake B2 are simultaneously operated. As a result, the sixth connecting member TM6 is connected with the input shaft IS by the operation of the second clutch C2, and torque of the input shaft IS is input to the fourth connecting member TM4 and the sixth connecting member TM6. In addition, while the first connecting member TM1 is acting as a fixed element, the fifth connecting member TM5 simultaneously acts as a fixed element by the operation of the second brake B2, thereby realizing the fourth forward speed by cooperative operation of respective connecting members and outputting a shifted torque through the output shaft OS connected with the eighth connecting member TM8.

In the fifth forward speed D5, the first and second brakes C1 and C2 are simultaneously operated. As a result, the third connecting member TM3 is connected with the input shaft IS by the operation of the first clutch C1, and the sixth connecting member TM6 is connected with the input shaft IS by the operation of the third clutch C3. In this state, torque of the input shaft IS is input to the third, fourth, and sixth connecting members TM3, TM4, and TM6. In addition, the first connecting member TM1 acts as a fixed element, thereby realizing the fifth forward speed by cooperative operation of respective connecting members and outputting a shifted torque through the output shaft OS connected with the eighth connecting member TM8.

In the sixth forward speed D6, the second and third brakes C2 and C3 are simultaneously operated. As a result, the sixth connecting member TM6 is connected with the input shaft IS by the operation of the second clutch C2, and the seventh connecting member TM7 is connected with the input shaft IS by the operation of the third clutch C3. In this state, torque of the input shaft IS is input to the fourth, sixth, and seventh connecting members TM4, TM6, and TM7. Then, the third and fourth planetary gear sets PG3 and PG4 integrally rotate at a same speed with the input shaft IS, thereby realizing the sixth forward speed and outputting a same torque as inputted through the output shaft OS connected with the eighth connecting member TM8.

In the seventh forward speed D7, the first and third brakes C1 and C3 are simultaneously operated. As a result, the third connecting member TM3 is connected with the input shaft IS by the operation of the first clutch C1, and the seventh connecting member TM7 is connected with the input shaft IS by the operation of the third clutch C3. In this state, torque of the input shaft IS is input to the third, fourth, and seventh connecting members TM3, TM4, and TM7. In addition, the first connecting member TM1 acts as a fixed element, thereby realizing the seventh forward speed by cooperative operation of respective connecting members and outputting a shifted torque through the output shaft OS connected with the eighth connecting member TM8.

In the eighth forward speed D8, the third clutch C3 and the second brake B2 are simultaneously operated. As a result, the seventh connecting member TM7 is connected with the input shaft IS by the operation of the third clutch C3, and torque of the input shaft IS is input to the fourth and seventh connecting members TM4 and TM7. In addition, while the first connecting member TM1 is acting as a fixed element, the fifth connecting member TM5 simultaneously acts as a fixed element by the operation of the second brake B2, thereby realizing the eighth forward speed by cooperative operation of respective connecting members and outputting a shifted torque through the output shaft OS connected with the eighth connecting member TM8.

In the ninth forward speed D9, the third clutch C3 and the first brake B1 are simultaneously operated. As a result, the seventh connecting member TM7 is connected with the input shaft IS by the operation of the third clutch C3, and torque of the input shaft IS is input to the fourth and seventh connecting members TM4 and TM7. In addition, while the first connecting member TM1 is acting as a fixed element, the second connecting member TM2 simultaneously acts as a fixed element by the operation of the first brake B1, thereby realizing the ninth forward speed by cooperative operation of respective connecting members and outputting a shifted torque through the output shaft OS connected with the eighth connecting member TM8.

In the reverse speed REV, the first clutch C1 and the third brake B3 are simultaneously operated. As a result, the third connecting member TM3 is connected with the input shaft IS by the operation of the first clutch C1, and torque of the input shaft IS is input to the third and fourth connecting members TM3 and TM4. In addition, while the first connecting member TM1 is acting as a fixed element, the seventh connecting member TM7 simultaneously acts as a fixed element by the operation of the third brake B3, thereby realizing the reverse speed by cooperation operation of respective connecting members and outputting a shifted torque through the output shaft OS connected with the eighth connecting member TM8.

As described above, a planetary gear train according to an exemplary embodiment of the present invention may realize at least nine forward speeds and at least one reverse speed formed by operating the four planetary gear sets PG1, PG2, PG3, and PG4 by controlling the three clutches C1, C2, and C3 and the three brakes B1, B2, and B3.

In addition, a planetary gear train according to an exemplary embodiment of the present invention may substantially improve driving stability by realizing shift stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
an input shaft configured for receiving an engine torque;
an output shaft configured for outputting a shifted torque;
a first planetary gear set having first, second, and third rotation elements;
a second planetary gear set having fourth, fifth, and sixth rotation elements;
a third planetary gear set having seventh, eighth, and ninth rotation elements;
a fourth planetary gear set having tenth, eleventh, and twelfth rotation elements;
six control elements for selectively interconnecting the first, second, third, fourth, fifth, sixth, seventh, eighth, ninth, tenth, eleventh, and twelfth rotation elements and a transmission housing;
a first connecting member connected with the first rotation element and directly connected with the transmission housing;
a second connecting member connected with the second rotation element and the fifth rotation element, and selectively connectable with the transmission housing;
a third connecting member connected with the third rotation element, and selectively connectable with the input shaft;
a fourth connecting member connected with the fourth rotation element and directly connected with the input shaft;
a fifth connecting member connected with the sixth rotation element and the ninth rotation element, and selectively connectable with the transmission housing;
a sixth connecting member connected with the seventh rotation element and the tenth rotation element, and selectively connectable with the input shaft;
a seventh connecting member connected with the eighth rotation element and the twelfth rotation element, and selectively connectable with the transmission housing; and
an eighth connecting member connected with the eleventh rotation element and directly connected with the output shaft.

2. The planetary gear train of claim 1, wherein
the first planetary gear set is a single pinion planetary gear set, where the first rotation element is a first sun gear, the second rotation element is a first planet carrier, and the third rotation element is a first ring gear;
the second planetary gear set is a single pinion planetary gear set, where the fourth rotation element is a second sun gear, the fifth rotation element is a second planet carrier, and the sixth rotation element is a second ring gear;
the third planetary gear set is a single pinion planetary gear set, where the seventh rotation element is a third sun gear, the eighth rotation element is a third planet carrier, and the ninth rotation element is a third ring gear; and
the fourth planetary gear set is a single pinion planetary gear set, where the tenth rotation element is a fourth sun gear, the eleventh rotation element is a fourth planet carrier, and the twelfth rotation element is a fourth ring gear.

3. The planetary gear train of claim 1, wherein the six control elements comprise:
a first clutch selectively connecting the input shaft and the third connecting member;
a second clutch selectively connecting the input shaft and the sixth connecting member;
a third clutch selectively connecting the input shaft and the seventh connecting member;
a first brake selectively connecting the second connecting member and the transmission housing;
a second brake selectively connecting the fifth connecting member and the transmission housing; and
a third brake selectively connecting the seventh connecting member and the transmission housing.

4. The planetary gear train of claim 3, wherein shift stages realized by selective operation of two control elements of the six control elements comprise:
a first forward speed formed by simultaneous operation of the first and third brakes;
a second forward speed formed by simultaneous operation of the second clutch and the third brake;
a third forward speed formed by simultaneous operation of the second clutch and the first brake;
a fourth forward speed formed by simultaneous operation of the second clutch and the second brake;
a fifth forward speed formed by simultaneous operation of the first and second clutches;
a sixth forward speed formed by simultaneous operation of the second and third clutches;
a seventh forward speed formed by simultaneous operation of the first and third clutches;
an eighth forward speed formed by simultaneous operation of the third clutch and the second brake;
a ninth forward speed formed by simultaneous operation of the third clutch and the first brake; and
a reverse speed formed by simultaneous operation of the first clutch and the third brake.

5. A planetary gear train of an automatic transmission for a vehicle, comprising:
an input shaft configured for receiving an engine torque;
an output shaft configured for outputting a shifted torque;
a first planetary gear set as a single pinion planetary gear set having first, second, and third rotation elements;
a second planetary gear set as a single pinion planetary gear set having fourth, fifth, and sixth rotation elements;
a third planetary gear set as a single pinion planetary gear set having seventh, eighth, and ninth rotation elements;
a fourth planetary gear set as a single pinion planetary gear set having tenth, eleventh, and twelfth rotation elements;
a first connecting member connected with the first rotation element and directly connected with a transmission housing;
a second connecting member connected with the second rotation element and the fifth rotation element, and selectively connectable with the transmission housing;
a third connecting member connected with the third rotation element, and selectively connectable with the input shaft;
a fourth connecting member connected with the fourth rotation element and directly connected with the input shaft;
a fifth connecting member connected with the sixth rotation element and the ninth rotation element, and selectively connectable with the transmission housing;
a sixth connecting member connected with the seventh rotation element and the tenth rotation element, and selectively connectable with the input shaft;

a seventh connecting member connected with the eighth rotation element and the twelfth rotation element, and selectively connectable with the transmission housing;
an eighth connecting member connected with the eleventh rotation element and directly connected with the output shaft;
a first clutch selectively connecting the input shaft and the third connecting member;
a second clutch selectively connecting the input shaft and the sixth connecting member;
a third clutch selectively connecting the input shaft and the seventh connecting member;
a first brake selectively connecting the second connecting member and the transmission housing;
a second brake selectively connecting the fifth connecting member and the transmission housing; and
a third brake selectively connecting the seventh connecting member and the transmission housing.

6. The planetary gear train of claim 5, wherein
the first planetary gear set includes a first sun gear as the first rotation element, a first planet carrier as the second rotation element, and a first ring gear as the third rotation element;
the second planetary gear set includes a second sun gear as the fourth rotation element, a second planet carrier as the fifth rotation element, and a second ring gear as the sixth rotation element;
the third planetary gear set includes a third sun gear as the seventh rotation element, a third planet carrier as the eighth rotation element, and a third ring gear as the ninth rotation element; and
the fourth planetary gear set includes a fourth sun gear as the tenth rotation element, a fourth planet carrier as the eleventh rotation element, and a fourth ring gear as the twelfth rotation element.

7. The planetary gear train of claim 5, wherein shift stages realized by selective operation of two control elements among the six control elements of the three clutches and the three brakes comprise:
a first forward speed formed by simultaneous operation of the first and third brakes;
a second forward speed formed by simultaneous operation of the second clutch and the third brake;
a third forward speed formed by simultaneous operation of the second clutch and the first brake;
a fourth forward speed formed by simultaneous operation of the second clutch and the second brake;
a fifth forward speed formed by simultaneous operation of the first and second clutches;
a sixth forward speed formed by simultaneous operation of the second and third clutches;
a seventh forward speed formed by simultaneous operation of the first and third clutches;
an eighth forward speed formed by simultaneous operation of the third clutch and the second brake;
a ninth forward speed formed by simultaneous operation of the third clutch and the first brake; and
a reverse speed formed by simultaneous operation of the first clutch and the third brake.

8. A planetary gear train of an automatic transmission for a vehicle, comprising:
an input shaft configured for receiving an engine torque;
an output shaft configured for outputting a shifted torque;
a first planetary gear set as a single pinion planetary gear set having a first sun gear, a first planet carrier, and a first ring gear;
a second planetary gear set as a single pinion planetary gear set having a second sun gear, a second planet carrier, and a second ring gear;
a third planetary gear set as a single pinion planetary gear set having a third sun gear, a third planet carrier, and a third ring gear;
a fourth planetary gear set as a single pinion planetary gear set having a fourth sun gear, a fourth planet carrier, and a fourth ring gear;
a first connecting member connected with the first sun gear, and directly connected with a transmission housing;
a second connecting member connected with the first planet carrier and the second planet carrier, and selectively connectable with the transmission housing;
a third connecting member connected with the first ring gear, and selectively connectable with the input shaft;
a fourth connecting member connected with the second sun gear and directly connected with the input shaft;
a fifth connecting member connected with the second ring gear and the third ring gear, and selectively connectable with the transmission housing;
a sixth connecting member connected with the third sun gear and the fourth sun gear, and selectively connectable with the input shaft;
a seventh connecting member connected with the third planet carrier and the fourth ring gear, and selectively connectable with the transmission housing;
an eighth connecting member connected with the fourth planet carrier, and directly connected with the output shaft; and
six control elements selectively connecting the first, second, third, fourth, fifth, sixth, seventh, and eighth connecting members and the transmission housing.

9. The planetary gear train of claim 8, wherein the six control elements comprise:
a first clutch selectively connecting the input shaft and the third connecting member;
a second clutch selectively connecting the input shaft and the sixth connecting member;
a third clutch selectively connecting the input shaft and the seventh connecting member;
a first brake selectively connecting the second connecting member and the transmission housing;
a second brake selectively connecting the fifth connecting member and the transmission housing; and
a third brake selectively connecting the seventh connecting member and the transmission housing.

10. The planetary gear train of claim 9, wherein shift stages realized by selective operation of two control elements of the six control elements comprise:
a first forward speed formed by simultaneous operation of the first and third brakes;
a second forward speed formed by simultaneous operation of the second clutch and the third brake;
a third forward speed formed by simultaneous operation of the second clutch and the first brake;
a fourth forward speed formed by simultaneous operation of the second clutch and the second brake;
a fifth forward speed formed by simultaneous operation of the first and second clutches;
a sixth forward speed formed by simultaneous operation of the second and third clutches;
a seventh forward speed formed by simultaneous operation of the first and third clutches;
an eighth forward speed formed by simultaneous operation of the third clutch and the second brake;

a ninth forward speed formed by simultaneous operation of the third clutch and the first brake; and a reverse speed formed by simultaneous operation of the first clutch and the third brake.

* * * * *